United States Patent
Lee et al.

(10) Patent No.: US 8,672,078 B2
(45) Date of Patent: Mar. 18, 2014

(54) EXTERNAL AIRBAG MODULE FOR VEHICLE AND BACK BEAM FOR MOUNTING EXTERNAL AIRBAG MODULE

(75) Inventors: Seoung Hoon Lee, Suwon-si (KR); Yong Sun Kim, Namyangju-si (KR); Un Koo Lee, Seoul (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 82 days.

(21) Appl. No.: 13/292,573

(22) Filed: Nov. 9, 2011

(65) Prior Publication Data
US 2012/0298438 A1    Nov. 29, 2012

(30) Foreign Application Priority Data
May 23, 2011    (KR) .................. 10-2011-0048577

(51) Int. Cl.
B60R 21/36    (2011.01)

(52) U.S. Cl.
USPC ............................ 180/271; 180/274; 280/736

(58) Field of Classification Search
USPC .................................. 180/271, 274; 280/736
See application file for complete search history.

(56) References Cited

U.S. PATENT DOCUMENTS

| | | | |
|---|---|---|---|
| 5,393,090 A * | 2/1995 | Shepherd et al. .......... 280/728.2 |
| 6,450,556 B1 * | 9/2002 | Jacobs ......................... 293/107 |
| 6,467,563 B1 * | 10/2002 | Ryan et al. .................... 180/274 |
| 6,802,526 B2 * | 10/2004 | Dumbrique et al. ........ 280/728.2 |
| 6,920,954 B2 * | 7/2005 | Hashimoto et al. ............ 180/274 |
| 6,923,483 B2 * | 8/2005 | Curry et al. ..................... 293/107 |
| 7,000,725 B2 * | 2/2006 | Sato et al. ....................... 180/274 |
| 7,013,951 B2 * | 3/2006 | Bauer et al. ....................... 165/41 |
| 7,073,619 B2 * | 7/2006 | Alexander et al. ............. 180/274 |
| 7,090,243 B2 * | 8/2006 | Igawa ......................... 280/728.2 |
| 7,150,495 B2 * | 12/2006 | Fayt et al. .................... 296/187.02 |
| 7,174,985 B2 * | 2/2007 | Sawa et al. ...................... 180/274 |
| 7,185,728 B2 * | 3/2007 | Makita et al. .................. 180/274 |
| 7,258,191 B1 * | 8/2007 | Rammer ........................ 180/274 |
| 7,287,618 B2 * | 10/2007 | Okamoto et al. .............. 180/274 |
| 7,784,817 B2 * | 8/2010 | Choi et al. .................. 280/728.2 |
| 7,836,996 B2 * | 11/2010 | Kitte et al. ..................... 180/271 |
| 7,845,455 B2 * | 12/2010 | Kim et al. ...................... 180/274 |
| 7,913,794 B2 * | 3/2011 | Takahashi et al. ............. 180/274 |
| 7,967,098 B2 * | 6/2011 | Choi ............................... 180/274 |
| 8,016,066 B1 * | 9/2011 | Boxey ............................ 180/271 |
| 2004/0074688 A1 * | 4/2004 | Hashimoto et al. ........... 180/271 |
| 2004/0074690 A1 * | 4/2004 | Sato et al. ...................... 180/274 |
| 2004/0107033 A1 * | 6/2004 | Rao et al. ......................... 701/45 |
| 2004/0262893 A1 * | 12/2004 | Kempf et al. ................ 280/730.1 |
| 2004/0262894 A1 * | 12/2004 | Kempf ......................... 280/730.1 |
| 2005/0230940 A1 * | 10/2005 | Alexander et al. .......... 280/730.1 |
| 2005/0269805 A1 * | 12/2005 | Kalliske et al. ............. 280/730.1 |
| 2006/0213714 A1 * | 9/2006 | Igawa ............................ 180/274 |
| 2007/0023222 A1 * | 2/2007 | Okamoto et al. .............. 180/274 |
| 2007/0182528 A1 * | 8/2007 | Breed et al. ..................... 340/435 |

(Continued)

*Primary Examiner* — Drew Brwon
*Assistant Examiner* — Barry Gooden, Jr.
(74) *Attorney, Agent, or Firm* — Morgan, Lewis & Bockius LLP

(57) ABSTRACT

An external airbag module for a vehicle, installed to be located in a space formed between a back beam and a front bumper may include an inflator secured to a front of the back beam and accommodated in the back beam, and an airbag cushion surrounding the inflator and secured to the back beam together with the inflator between the back beam and the front bumper.

8 Claims, 4 Drawing Sheets

(56) References Cited

U.S. PATENT DOCUMENTS

| | | | |
|---|---|---|---|
| 2008/0040004 A1* | 2/2008 | Breed | 701/45 |
| 2009/0001691 A1* | 1/2009 | Takimoto et al. | 280/728.1 |
| 2009/0102167 A1* | 4/2009 | Kitte et al. | 280/728.2 |
| 2010/0140903 A1* | 6/2010 | Choi et al. | 280/728.2 |

* cited by examiner

EXTERNAL AIRBAG MODULE FOR VEHICLE AND BACK BEAM FOR MOUNTING EXTERNAL AIRBAG MODULE

CROSS-REFERENCE TO RELATED APPLICATIONS

The present application claims priority to Korean Patent Application No. 10-2011-0048577 filed on May 23, 2011, the entire contents of which is incorporated herein for purposes by this reference.

BACKGROUND OF THE INVENTION

1. Field of the Invention

The present invention relates generally to an external airbag module for a vehicle and a back beam for mounting the external airbag module and, more particularly, to an external airbag module for a vehicle and a back beam for mounting the external airbag module, which are intended to more efficiently install the external airbag module in a space between the back beam and a front bumper.

2. Description of Related Art

Generally, a front body structure of a vehicle includes a bumper stay which is coupled to a vehicle body, a back beam which is coupled to the bumper stay, an absorber which is coupled to a front of the back beam to absorb collision energy, and a front bumper which is coupled to the vehicle body in such a way as to surround the absorber and is exposed to the outside.

However, collision energy produced in the event of a vehicle collision is not sufficiently absorbed only by the absorber and the front bumper, so that most of the collision energy is transmitted to the vehicle body, thus causing serious damage to parts of the vehicle. The serious damage to the vehicle parts may injure a passenger.

In order to solve these problems, an external airbag module is installed in a space between the back beam and the front bumper. The external airbag module includes an inflator and an airbag cushion, is mounted to the front of the back beam, and is surrounded by the front bumper.

However, the conventional external airbag module is problematic in that the space between the back beam and the front bumper is very small, so that the external airbag module is not efficiently installed. If the space is too small, the external airbag module interferes with the front bumper and thereby the airbag cushion may be damaged.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an external airbag module for a vehicle installed in a space between a back beam and a front bumper and a back beam for mounting the external airbag module, which allow the external airbag module to be more efficiently installed, thus preventing an airbag cushion from being damaged.

In an aspect, the present invention provides an external airbag module for a vehicle installed to be located in a space between a back beam and a front bumper, the external airbag module including an inflator secured to a front of the back beam in such a way as to be accommodated in the back beam, and an airbag cushion surrounding the inflator and secured to the back beam together with the inflator.

The airbag cushion may be installed to be accommodated in the back beam together with the inflator, or the airbag cushion may be installed to protrude forwards from the back beam without being accommodated in the back beam.

A back beam recess may be formed in the front of the back beam to accommodate the inflator or accommodate both the inflator and the airbag cushion, the back beam recess being formed in a longitudinal direction of the back beam that may be a transverse direction of a vehicle body.

Further, another embodiment of the present invention provides an external airbag module for a vehicle installed to be located in a space between a back beam and a front bumper, the external airbag module including an airbag bracket secured to a front of the back beam in such a way as to be accommodated in the back beam, an inflator secured to the airbag bracket in such a way as to be accommodated in the back beam, and an airbag cushion surrounding the airbag bracket and the inflator, and secured to the back beam together with the airbag bracket.

The external airbag module may further include a heat shielding member which may be fitted between the airbag bracket and the airbag cushion, may be shaped into an arc that may be open at a front thereof and surrounds the inflator, and prevents the airbag cushion from being damaged by explosion heat of the inflator, and a gas guider which may be fitted between the airbag cushion and the heat shielding member and may be installed to surround the inflator, with a plurality of gas discharge holes being formed on a front of the gas guider to guide a flow of the airbag gas forwards.

The airbag bracket may be provided with a plurality of band-shaped retainers, and the inflator may be coupled to a front of the airbag bracket in such a way as to be surrounded by the retainers.

The heat shielding member may be formed of aluminum foil.

The airbag bracket may be provided with a plurality of stud bolts, the heat shielding member, the gas guider, and the airbag cushion may be sequentially fitted over the stud bolts, and each of the stud bolts may be fastened to a nut after passing through the back beam.

Further, the present invention provides a back beam for mounting an external airbag module, including a back beam recess which may be formed integrally in a front of the back beam to accommodate the external airbag module, and closed spaces which may be provided on upper and lower portions of the back beam recess, each of the closed spaces having a box structure.

The back beam recess may be curved to be in contact with a rear of the back beam, and a plurality of bolt holes may be formed at a position where the back beam recess may be in contact with the rear of the back beam.

The present invention is advantageous in that an external airbag module 10 can be more efficiently installed in a narrow space between a back beam 20 and a front bumper 30, thus preventing an airbag cushion 12 from being damaged and allowing the airbag cushion 12 to be more reliably deployed, and high temperature heat generated when an inflator 11 explodes is not transmitted to the airbag cushion 12 that is near to the inflator 11, thus preventing damage to the airbag cushion 12, and the flow of airbag gas generated during the explosion of the inflator 11 can be guided to the front where the airbag cushion 12 is located, thus enabling the airbag cushion 12 to be precisely deployed, and shortening deployment time, therefore maximally protecting the safety of passengers.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
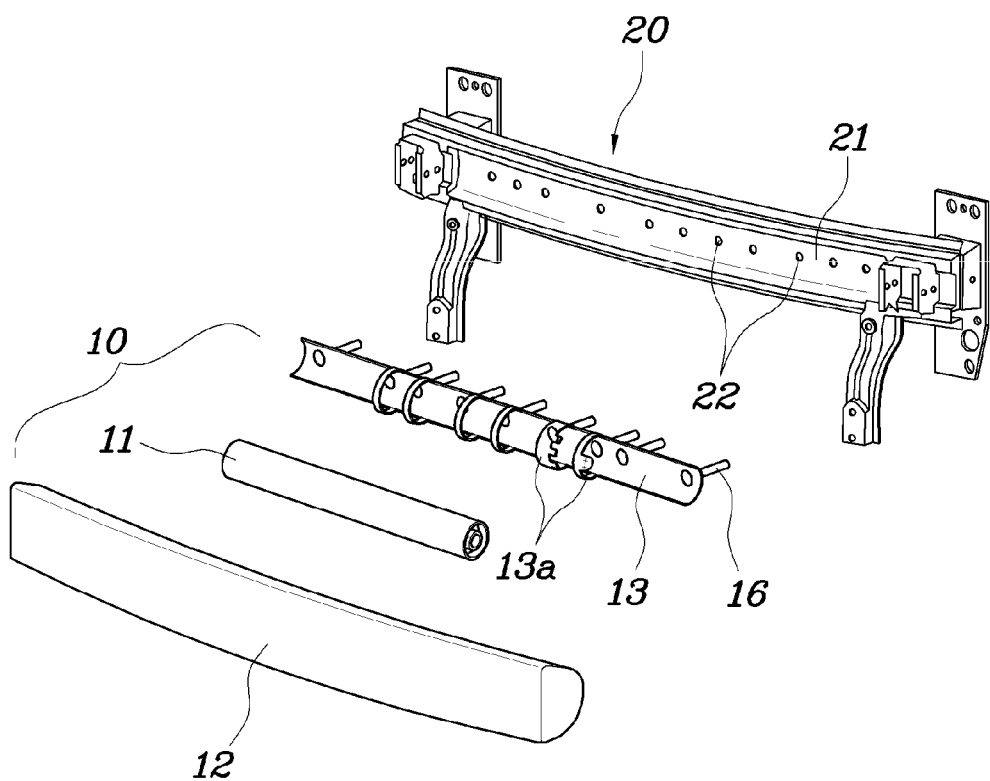
FIG. 1 is a perspective view showing an external airbag module according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, embodiments of the present invention will be described in detail with reference to the accompanying drawings.

Figure 2:
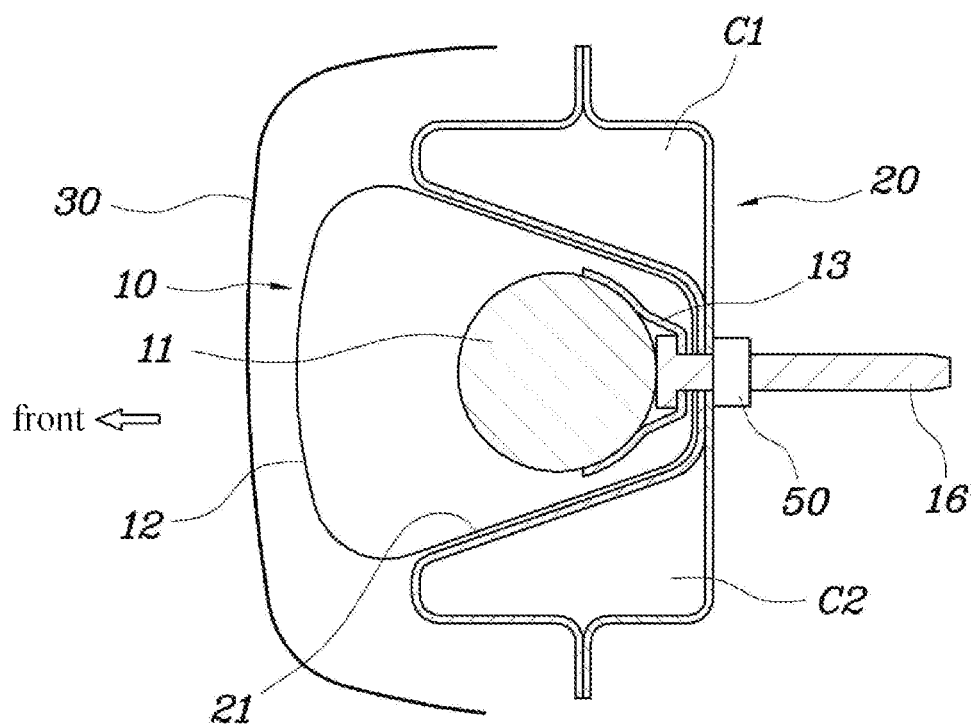
FIG. 2 is a sectional view showing the assembled state of FIG. 1.

As shown in FIGS. 1 and 2, an external airbag module 10 for a vehicle according to an exemplary embodiment of the present invention is installed to be located in a space between a back beam 20 and a front bumper 30. The external airbag module 10 includes an inflator 11 which is secured to a front of the back beam 20 in such a way as to be accommodated in the back beam 20, and an airbag cushion 12 which is secured to the back beam 20 together with the inflator 11 while surrounding the inflator 11.

Here, the airbag cushion 12 is mounted to the front of the back beam 20 in such a way as to be accommodated in the back beam 20 together with the inflator 11, as shown in FIG. 2. Further, the airbag cushion 12 may not be accommodated in the back beam 20, but may be mounted to protrude forwards from the back beam 20, as shown in FIG. 3.

Since a general small- or medium-sized vehicle is small in the volume of the airbag cushion 12, it is preferable that the airbag cushion 12 be mounted to the front of the back beam 20 in such a way as to be accommodated in the back beam 20 together with the inflator 11, as shown in FIG. 2. Since a large-sized vehicle is large in the volume of the airbag cushion 12, it is preferable that the airbag cushion 12 protrude forwards from the back beam 20, as shown in FIG. 3.

Figure 3:
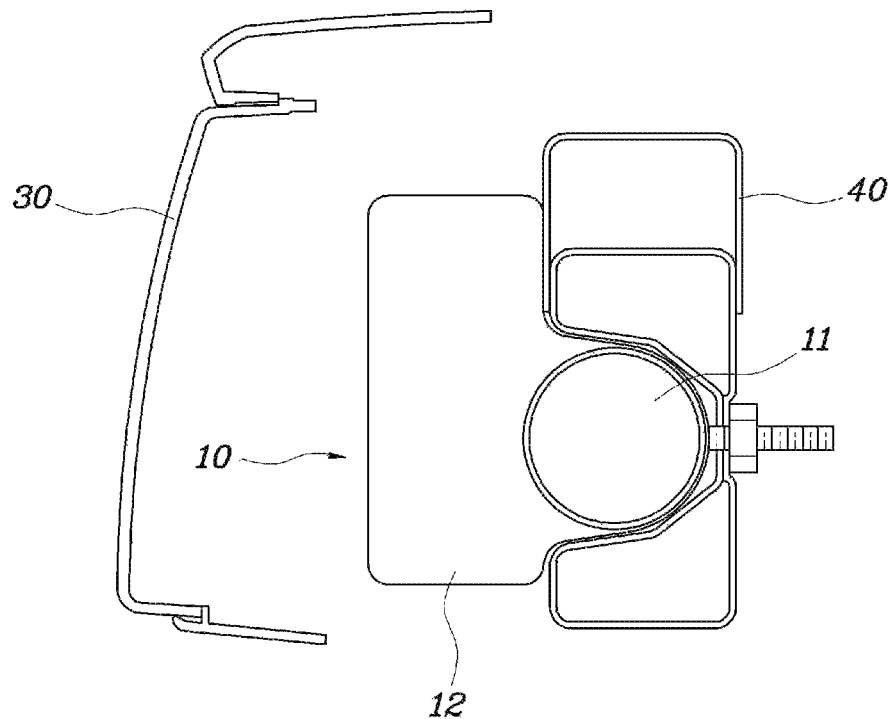
FIG. 3 is a view showing an exemplary embodiment which is different from that of FIG. 2.
Figure 4:
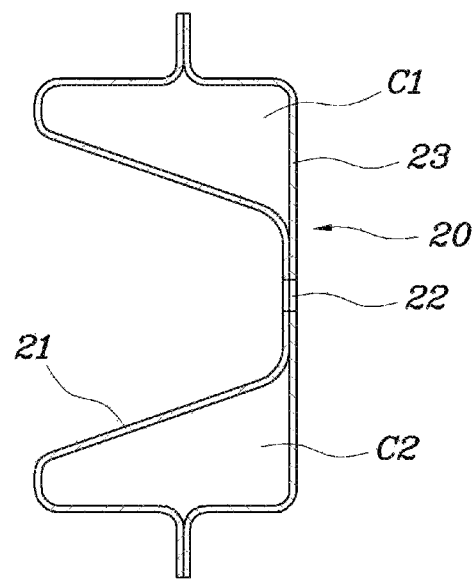
FIG. 4 is a view showing an external airbag module according to another embodiment of the present invention.

Here, when the airbag cushion 12 protrudes forwards from the back beam 20 as shown in FIG. 3, it is preferable that the airbag cushion 12 be supported by an upper bracket 40 secured to the upper end of the back beam 20. Such a structure allows the upper end of the airbag cushion 12 to be supported by the upper bracket 40, thus enabling the stable installation of the airbag cushion 12.

A back beam recess 21 is formed in the front of the back beam 20 in such a way as to extend in a longitudinal direction of the back beam 20 that is the transverse direction of the vehicle body. The back beam recess 21 may accommodate the inflator 11 as shown in FIG. 3, or may accommodate both the inflator 12 and the airbag cushion 11 as shown in FIG. 2.

As such, if the back beam recess 21 is formed in the front of the back beam 20 and the external airbag module 10 is installed to be accommodated in the back beam recess 21, the external airbag module 10 can be more efficiently installed in the narrow space between the back beam 20 and the front bumper 30, and in addition, the interference between the front bumper 30 and the airbag cushion 12 can be prevented, thus preventing damage to the airbag cushion 12, therefore allowing the airbag cushion 12 to be more reliably deployed.

Hereinafter, the external airbag module 10 according to another embodiment of the present invention will be described with reference to FIGS. 1 to 4.

The external airbag module 10 according to an exemplary embodiment of the present invention includes an airbag bracket 13 which is mounted to the front of the back beam 20 in such a way as to be accommodated in the back beam 20. The inflator 11 is secured to the airbag bracket 13 in such a way as to be accommodated in the back beam 20. The airbag cushion 12 is secured to the back beam 20 together with the airbag bracket 13 in such a way as to surround the airbag bracket 13 and the inflator 11. A heat shielding member 14 is fitted between the airbag bracket 13 and the airbag cushion 12, is formed in the shape of an arc which is open to the front while surrounding the inflator 11, and prevents the airbag cushion 12 from being damaged by the explosion heat of the inflator 11. A gas guider 15 is fitted between the airbag cushion 12 and the heat shielding member 14 in such a way as to surround the inflator 11, and is provided with a plurality of gas discharge holes 15a on the front of the gas guider 15, thus guiding the flow of the airbag gas to the front (the direction M1 shown by the arrow of FIG. 5).

If the inflator 11 explodes, high temperature heat is produced. The explosion heat of high temperature may damage a portion of the airbag cushion 12 which is adjacent to the inflator 11 (the area B1 shown by the dotted lines of FIG. 5).

Therefore, according to an exemplary embodiment of the present invention, the heat shielding member 14 is mounted to surround the inflator 11, thus preventing the explosion heat of high temperature from being transferred to the portion of the airbag cushion 12 which is adjacent to the inflator 11, and preventing the airbag cushion 12 from being damaged by the explosion heat of high temperature, therefore allowing the airbag cushion 12 to be more reliably deployed.

The heat shielding member 14 is preferably made of aluminum foil that is efficient to shield heat and is light in weight, but is not limited thereto.

The gas guider 15 guides the flow of airbag gas, produced when the inflator 11 explodes, to the front at which the airbag cushion 12 is located, thus allowing the airbag cushion 12 to be precisely deployed, and shortening deployment time, thereby maximally protecting the safety of passengers.

In the case of having the airbag bracket 13 as such, the airbag bracket 13 is provided with a plurality of band-shaped retainers 13a, and the inflator 11 is mounted to the front of the airbag bracket 13 in such a way as to be surrounded by the retainers 13a.

Each retainer 13a having the arc shape is constructed so that its length is adjustable, and is provided on the airbag bracket 13. Thus, the length of the retainer 13a may be adjusted according to the diameter of the inflator 11, so that the inflator 11 can be more reliably coupled to the airbag bracket 13.

The airbag bracket 13 is coupled to the back beam 20. To this end, the airbag bracket 13 is provided with a plurality of stud bolts 16, and the heat shielding member 14, the gas guider 15 and the airbag cushion 12 are sequentially fitted over the stud bolts 16, and the stud bolts 16 are fastened to nuts 50 after passing through the back beam 20.

Further, bolt holes 22 are formed in the back beam 20 so that the stud bolts 16 are inserted into the bolt holes 22.

In the construction including the airbag bracket 13, the heat shielding member 14 and the gas guider 15, the airbag cushion 12 may be installed to be accommodated in the back beam recess 21 together with the inflator 11 (the small- or medium-sized vehicle), or may protrude forwards from the back beam recess 21 without being accommodated in the back beam recess 21 (the large-sized vehicle).

Here, when the airbag cushion 12 is installed to protrude forwards from the back beam recess 21, as described above, the airbag cushion 12 is preferably installed to be supported by the upper bracket 40 which is secured to the upper end of the back beam 20.

Figure 5:
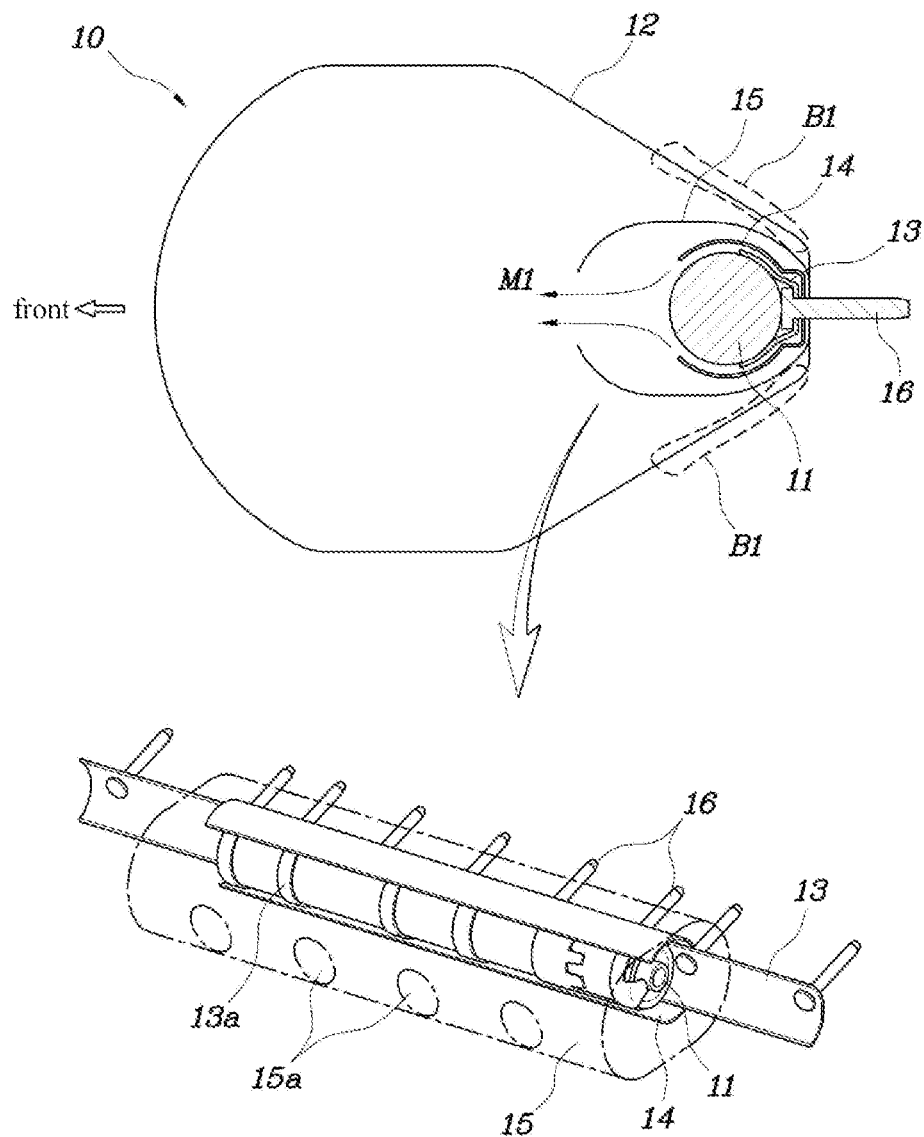
FIG. 5 is a view illustrating the structure of a back beam according to an exemplary embodiment of the present invention.

Further, as shown in FIGS. 2 and 5, the back beam 20 to which the external airbag module 10 for the vehicle according to an exemplary embodiment of the present invention is mounted is constructed so that the back beam recess 21 for accommodating the external airbag module 10 is integrally fog need on the front of the back beam 20, and closed spaces C1 and C2 of a box structure are provided on the upper and lower portions of the back beam recess 21.

The back beam recess 21 is formed in the longitudinal direction of the back beam 20 that is the transverse direction of the vehicle body.

The back beam 20 has the closed spaces C1 and C2 of the box structure on the upper and lower portions of the back beam recess 21, thus more stably retaining strength.

Here, the back beam recess 21 is curved in such a way as to be in contact with a rear 23 of the back beam 20, and a plurality of bolt holes 22 is formed at a position where the back beam recess 21 is in contact with the rear 23 of the back beam 20.

As described above, the present invention is advantageous in that the back beam recess 21 is formed in the front surface of the back beam 20 and the external airbag module 10 is accommodated in the back beam recess 21, so that the external airbag module 10 can be more efficiently installed in the narrow space between the back beam 20 and the front bumper 30, and interference between the front bumper 30 and the airbag cushion 12 can be prevented, thus preventing damage to the airbag cushion 12, thereby allowing the airbag cushion 12 to be more reliably deployed.

Further, the present invention is advantageous in that the external airbag module 10 includes the heat shielding member 14, thus preventing the explosion heat of high temperature from being transferred to the portion of the airbag cushion 12 that is adjacent to the inflator 11, and preventing damage to the airbag cushion 12 due to the explosion heat of high temperature, thereby allowing the airbag cushion 12 to be more reliably deployed.

Furthermore, the present invention is advantageous in that the external airbag module 10 includes the gas guider 15, so that the gas guider 15 guides the flow of airbag gas produced by the explosion of the inflator 11 to the front at which the airbag cushion 12 is located, thus allowing the airbag cushion 12 to be precisely deployed and shortening deployment time, thereby maximally protecting the safety of passengers.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An external airbag module for a vehicle, installed to be located in a space between a back beam and a front bumper, the external airbag module comprising:
   an airbag bracket secured to a front of the back beam and accommodated in the back beam;
   an inflator secured to the airbag bracket and accommodated in the back beam;
   an airbag cushion surrounding the airbag bracket and the inflator, and secured to the back beam together with the airbag bracket;
   a heat shielding member fitted between the airbag bracket and the airbag cushion, shaped into an arc that is open at a front thereof and surrounds the inflator to prevent the airbag cushion from being damaged by explosion heat of the inflator; and
   a gas guider fitted between the airbag cushion and the heat shielding member and installed to surround the inflator, with a plurality of gas discharge holes being formed on a front of the gas guider to guide a flow of airbag gas forwards.

2. The external airbag module as set forth in claim 1, wherein the airbag bracket is provided with a plurality of band-shaped retainers, and
   the inflator is coupled to a front of the airbag bracket and surrounded by the retainers.

3. The external airbag module as set forth in claim 1, wherein the heat shielding member is formed of aluminum foil.

4. The external airbag module as set forth in claim 1,
   wherein the airbag bracket is provided with a plurality of stud bolts,
   wherein the heat shielding member, the gas guider, and the airbag cushion are sequentially fitted over the plurality of stud bolts, and
   wherein each of the plurality of stud bolts is fastened to a nut after passing through the back beam.

5. The external airbag module as set forth in claim 1, wherein the airbag cushion is installed to be accommodated on the back beam together with the inflator.

6. The external airbag module as set forth in claim 5, wherein a back beam recess is formed in the front of the back beam to accommodate the inflator together with the airbag bracket or simultaneously accommodate the inflator and the airbag cushion together with the airbag bracket, and is formed in a longitudinal direction of the back beam that is a transverse direction of a vehicle body.

7. The external airbag module as set forth in claim 1, wherein the airbag cushion is installed to protrude forwards from the back beam.

8. The external airbag module as set forth in claim 7, wherein, when the airbag cushion is installed to protrude forwards from the back beam, the airbag cushion is mounted to be supported by an upper bracket that is secured to an upper end of the back beam.

\* \* \* \* \*